H. TORGERSEN.
HAY RAKE.
APPLICATION FILED MAR. 20, 1911.
1,001,904.
Patented Aug. 29, 1911.
2 SHEETS—SHEET 2.
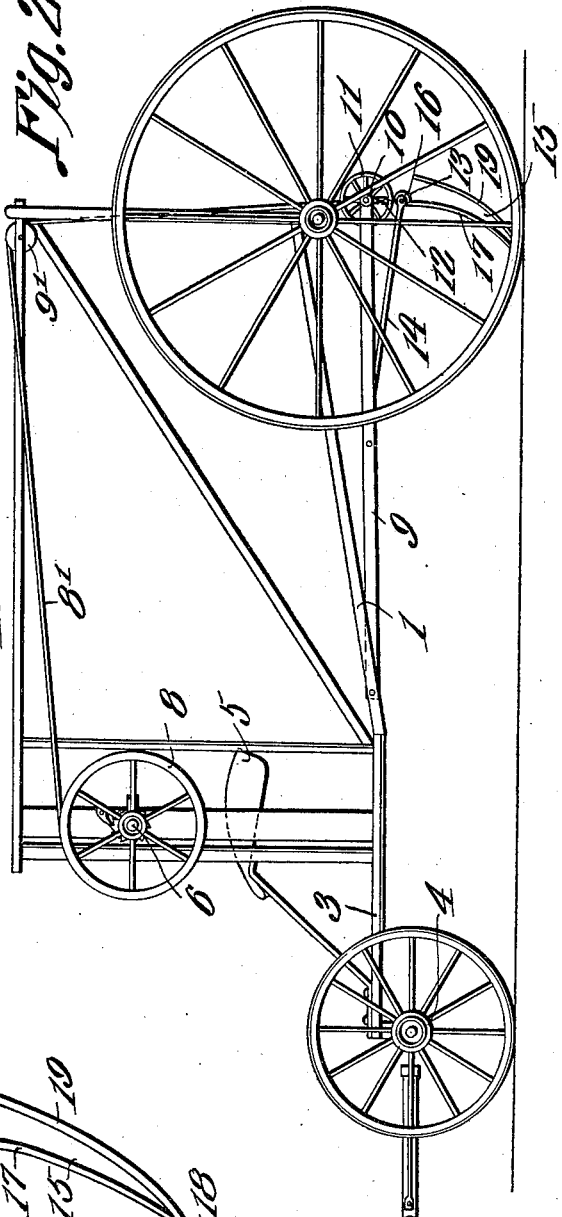
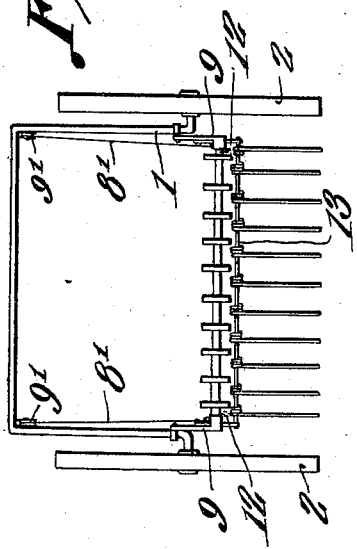
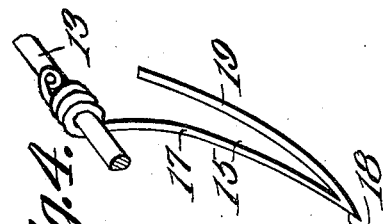
Witnesses
Hjalmar Torgersen,
Inventor
by C. A. Snow & Co.
Attorneys

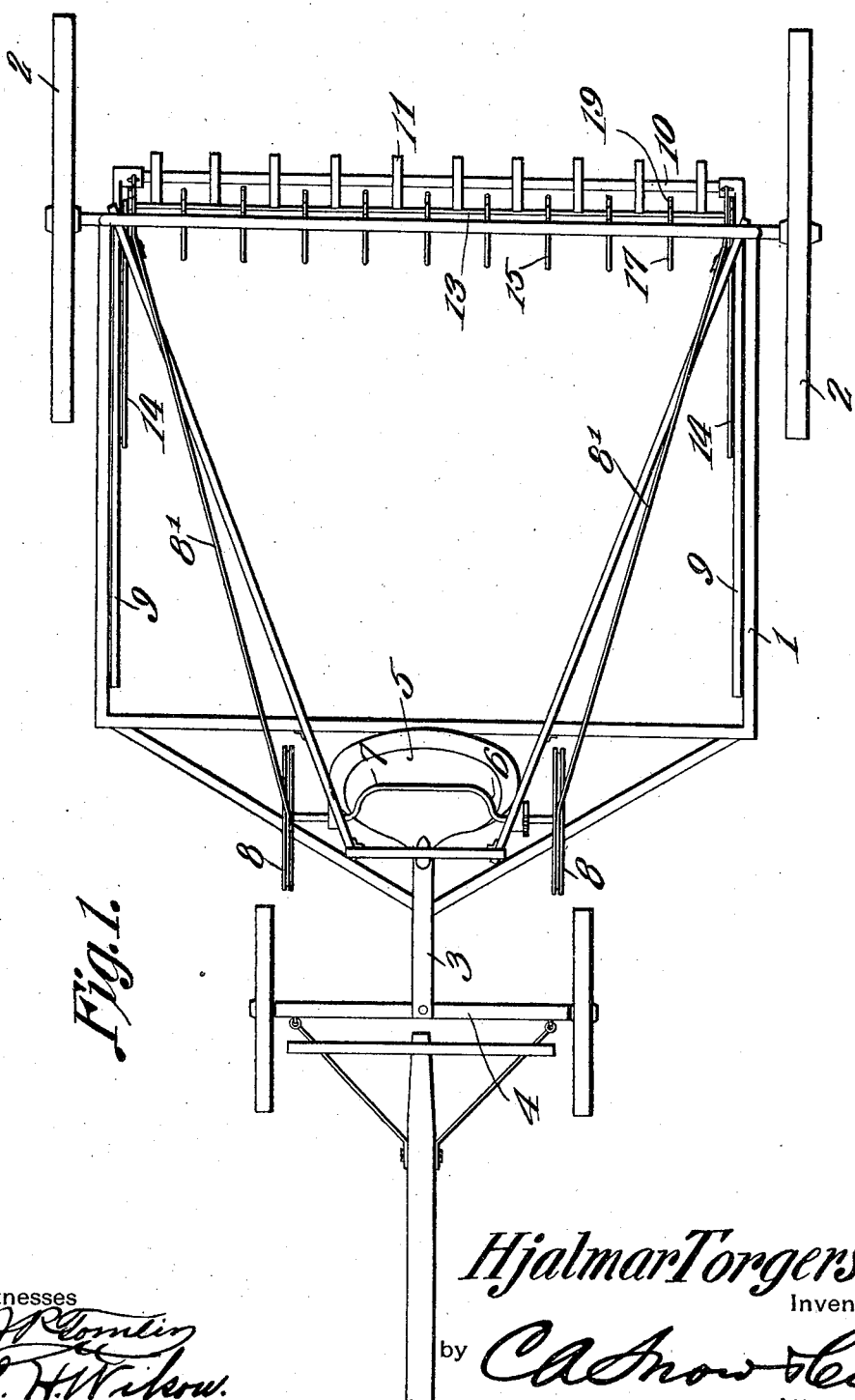

UNITED STATES PATENT OFFICE.

HJALMAR TORGERSEN, OF ASHBY, MINNESOTA.

HAY-RAKE.

1,001,904.   Specification of Letters Patent.   Patented Aug. 29, 1911.

Application filed March 20, 1911.   Serial No. 615,748.

*To all whom it may concern:*

Be it known that I, HJALMAR TORGERSEN, a citizen of the United States, residing at Ashby, in the county of Ottertail and State of Minnesota, have invented a new and useful Hay-Rake, of which the following is a specification.

This invention has relation to hay rakes and consists in the novel construction and arrangement of its parts as hereinafter shown and described.

The object of the invention is to provide a rake adapted to accumulate a bundle or roll of hay of considerable transverse dimension and having means for rolling the said bundle or roll as the rake passes over the ground and manually operable means for lifting the raking elements and retaining parts in order that the said bundle or roll may be freed from the rake when desired. With this object in view the rake includes a frame which is mounted at its rear end upon supporting wheels and which at its forward end is coupled with a truck. Arms are pivotally connected at their forward ends with the forward portions of the sides of the said frame and at their rear ends carry a journal shaft upon which wheels are fixed at intervals apart. Means are provided for raising and lowering the rear ends of these arms at the shaft carried thereby. A bar is held in suspension by a flexible member from the said shaft and rake teeth of peculiar configuration are fixed to the said bar. The bar is also pivotally connected with the said arms by means of rods as will hereinafter appear.

In the accompanying drawings—Figure 1 is a top plan view of the rake. Fig. 2 is a side elevation of the same. Fig. 3 is a view showing the rear end of the machine in elevation on a reduced scale. Fig. 4 is a perspective view of one of the teeth and its supporting bar.

The rake consists of a frame 1 which is supported at its rear portion upon ground wheels 2. The frame 1 at its rear end is open and the intermediate upper portion of the said frame is elevated in order that the space within the sides of the frame may accommodate a roll or bundle of hay of considerable transverse dimension. A reach 3 is attached to the forward portion of the frame 1 and is pivotally supported upon a truck 4. An operator's seat 5 is mounted upon the rear portion of the reach 3. A shaft 6 is journaled for rotation at the forward portion of the frame 1 and at an intermediate point and in front of the operator's seat 5 is provided with a crank portion 7. Winding drums or wheels 8 are fixed to the end portions of the said shaft 6 and any suitable ratchet device of usual pattern may be provided for temporarily holding the shaft 6 from rotation. Bars 9 are pivotally connected at their forward ends with the forward side portions of the frame 1 and a shaft 10 is journaled for rotation at the rear ends of the said bars. At intervals along the length of the shaft 10 wheels 11 are fixed. Chains or similar flexible members 12 depend from the shaft 10 and are attached to the end portions of a bar 13. Rods 14 are attached at their rear ends to the end portions of the bar 13 and at their forward ends are pivotally connected with the arms 9 at points intermediate the ends thereof. Rake teeth 15 are fixedly secured at intervals along the length of the bar 13 and as illustrated in the drawing are provided with coils 16 which surround the bar 13. The teeth 15 are preferably made from spring metallic rod and are of peculiar configuration. The forward portions of the teeth extend from the front of the bar 13 down to the vicinity of the surface of the ground thence the rod is bent back forming an acuminate point 18 with the other end portion of the rod extending up behind the portion 17 and disconnected from the same at its upper end and forming a fender 19 which is adapted to prevent the hay from wrapping around the forward portion 17 of the tooth.

In operation as the rake is drawn over the surface of the ground and the hay is accumulated by the forward portions 17 of the teeth 15 the said hay will pass up along the said portions and eventually will form into a bundle or roll resting at its lower portion upon the ground. When the roll encounters the peripheries of the wheels 11, the said wheels will rotate and will assist in regular rolling of the bundle or roll along the surface of the ground as the rake moves over the same. When a bundle or roll of considerable transverse dimension has been accumulated within the sides of the frame 1, the operator occupying the seat 5 turns the crank 7 and rotates the shaft 6 which in turn will wind the cables 8' upon the drums or wheels 8. These cables are trained over pulleys 9' journaled upon the rear portion of the frame and at their rear ends are connected with the shaft 10. Thus the said shaft 10 and the rear ends of the arms will be swung in an upward direction and the chains 12 will carry the bar 13 and the teeth 15 in an upward direction with the said shaft 10. Thus the teeth are lifted above the roll which has been accumulated between the sides of the frame 1 and the said rolls will come to a state of rest while the rake will advance beyond the same. The roll thus accumulated will be of considerable transverse dimension and may be grappled by haying tools and lifted upon a wagon and carried to a suitable place of storage.

Having described the invention what I claim is new and desire to secure by Letters Patent is:

1. A rake comprising a wheel supported frame, rake teeth movable with the frame, wheels close to and above the teeth for engaging the gathered material, said wheels being adapted to freely rotate.

2. A rake comprising a wheel supported frame, arms pivotally attached to the side portions thereof, a shaft journaled between the rear portions of the arms, means for raising and lowering the shaft and arms, wheels fixed at intervals along the length of the said shaft, flexible members depending from the shaft, a bar supported by said flexible members, rods pivotally connected with the arms at their forward ends and connected with said shaft at their rear ends and rake members mounted at intervals along the said bar.

3. A rake comprising a wheel supported frame, rake teeth movable therewith, a series of wheels mounted to freely rotate above and close to the teeth, said wheels constituting means for engaging the gathered material, and means under the control of the operator for lifting the wheels and teeth.

In testimony that I claim the foregoing as my own, I have hereto affixed my signature in the presence of two witnesses.

HJALMAR TORGERSEN.

Witnesses:
 L. J. HAUGE,
 HERMAN LARSON.